(12) United States Patent
Coccaro (10) Patent No.: US 10,569,903 B2
(45) Date of Patent: Feb. 25, 2020

(54) HELICOPTER DOLLY

(71) Applicant: Albert V. Coccaro, Mt. Kisco, NY (US)

(72) Inventor: Albert V. Coccaro, Mt. Kisco, NY (US)

( * ) Notice: Subject to any disclaimer, the term of this patent is extended or adjusted under 35 U.S.C. 154(b) by 353 days.

(21) Appl. No.: 15/807,238

(22) Filed: Nov. 8, 2017

(65) Prior Publication Data

US 2019/0135451 A1    May 9, 2019

(51) Int. Cl.
*B64F 1/22*     (2006.01)
*B60P 3/11*     (2006.01)
*B62B 5/00*     (2006.01)
*B64C 25/52*    (2006.01)

(52) U.S. Cl.
CPC .................... *B64F 1/22* (2013.01);
*B60P 3/11* (2013.01); *B62B 5/0093* (2013.01);
*B62B 2202/90* (2013.01); *B62B 2203/44* (2013.01); *B64C 25/52* (2013.01)

(58) Field of Classification Search
CPC . B64F 1/22; B60P 3/11; B62B 5/0093; B62B 2202/90; B62B 2203/44; B64C 25/52
See application file for complete search history.

(56) References Cited

U.S. PATENT DOCUMENTS

| | | | | |
|---|---|---|---|---|
| 3,586,187 | A | * | 6/1971 | Wright ...................... B64F 1/22 414/428 |
| 3,598,259 | A | * | 8/1971 | Wright ................. B62D 53/068 414/428 |
| 4,223,856 | A | | 9/1980 | DiVincenzo |
| 4,488,612 | A | | 12/1984 | Patterson |
| 4,516,744 | A | | 5/1985 | Burnside |
| 4,580,764 | A | | 4/1986 | Oldani |
| 5,056,981 | A | | 10/1991 | Knowles |
| 5,135,346 | A | | 8/1992 | Roach |
| 6,325,403 | B1 | | 12/2001 | Brutger |
| 7,074,003 | B2 | | 7/2006 | Klein |
| 2005/0129491 | A1 | * | 6/2005 | Smith .................... B62B 1/142 414/490 |

FOREIGN PATENT DOCUMENTS

WO    WO-8801857 A1 *  3/1988  ............ A61G 5/104

* cited by examiner

*Primary Examiner* — Rodney A Bonnette
(74) *Attorney, Agent, or Firm* — Law Offices of Michael L. Wise, LLC (57) ABSTRACT

An apparatus including a platform, casters attached to the platform, and a carriage supported by the platform is described. The carriage includes a left arm, a right arm, and an actuation mechanism. The left arm can pivot about a left lateral axis, and the right arm can pivot about a right lateral axis. The actuation mechanism allows a distance between a proximal end of the left arm and a proximal end of the right arm to be modified. Increasing the distance causes a distal end of the left arm and a distal end of the right arm to swing towards each other. Decreasing the distance causes the distal end of the left arm and the distal end of the right are to swing away from each other. The apparatus provides a convenient means by which to move a helicopter equipped with skids while the helicopter is on the ground.

18 Claims, 12 Drawing Sheets

HELICOPTER DOLLY

FIELD OF THE INVENTION

The present invention relates generally to wheeled platforms, and, more particularly, to dollies designed to assist in the ground movement of helicopters equipped with skids.

BACKGROUND OF THE INVENTION

It is frequently desirable to place a helicopter into a hangar or other shelter between flights. Nevertheless, because helicopters are often configured with skids rather than wheels, they become difficult to move once on the ground. Moving a helicopter into a hangar thereby becomes a challenging task and requires specialized equipment.

One solution to the above-identified problem is simply to have the helicopter land on a flat trailer and then towing the trailer and helicopter into a hangar. Nevertheless, this solution requires the presence of the trailer, some means of towing the trailer, and a pilot with enough skill to reliably land on a small platform. Other solutions have also been proposed and can be found in, for example, U.S. Pat. Nos.: 4,223,856; 4,488,612; 4,516,744; 4,580,764; 5,056,981; 5,135,346; 6,325,403; and 7,074,003. However, these solutions may be overly complex, expensive, and/or difficult to use. They may also be too large and/or heavy to be easily transported in a helicopter, making these solutions unavailable when the helicopter travels away from its home base.

For the foregoing reasons, there is a need for alternative solutions for moving helicopters equipped with skids while the helicopters are on the ground.

SUMMARY OF THE INVENTION

Embodiments of the present invention address the above-identified needs by providing wheeled platforms (i.e., dollies) adapted to move helicopters equipped with skids while the helicopters are on the ground.

Aspects of the invention are directed to an apparatus comprising a plurality of casters pivotally attached to the platform and a carriage supported by the platform. The carriage comprises a left arm, a right arm, and an actuation mechanism. The left arm is operative to pivot about a left lateral axis, and the right arm is operative to pivot about a right lateral axis that is substantially parallel to the left lateral axis. The actuation mechanism is operatively coupled to a proximal end of the left arm and a proximal end of the right arm, and is adapted to allow a distance between the proximal end of the left arm and the proximal end of the right arm to be modified. Increasing the distance causes a distal end of the left arm and a distal end of the right arm to swing towards each other. Decreasing the distance causes the distal end of the left arm and the distal end of the right arm to swing away from each other.

Additional aspects of the invention are directed to the above-described apparatus in combination with a helicopter comprising a skid. The left arm and the right arm are pressed against the skid, and the plurality of casters support some portion of a weight of the helicopter.

Even additional aspects of the invention are directed to a method of moving a helicopter with a skid initially resting on a ground surface. The above-described apparatus is acquired. The left arm and the right arm are caused to swing against the skid and to lift at least part of the skid off the ground surface so that the plurality of casters are supporting some portion of a weight of the helicopter.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, the term "substantially parallel" and "substantially perpendicular" mean within plus or minus ten degrees of absolutely parallel and absolutely perpendicular, respectively.

Figure 1:
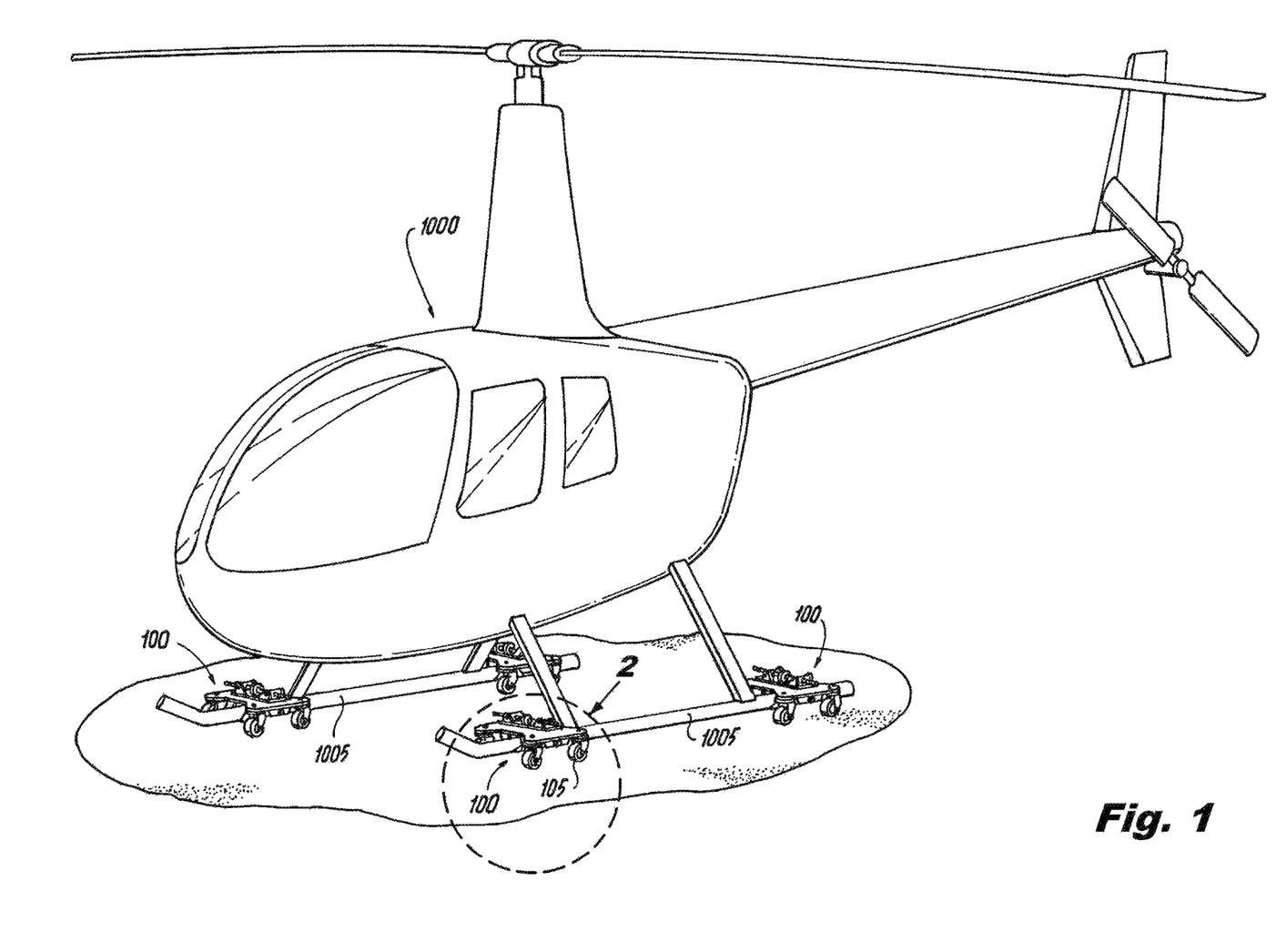
FIG. 1 shows a helicopter in combination with four illustrative apparatus embodying aspects of the invention.

FIG. 1 shows a perspective view of a helicopter 1000 in combination with four illustrative apparatus 100 embodying aspects of the invention. The apparatus 100 (hereinafter, called "dollies" 100) are attached to the landing skids 1005 of the helicopter 1000, with two dollies 100 attached to one skid 1005, and the remaining two dollies 100 attached to the other skid 1005. The dollies 100 allow the skids 1005 of the helicopter 1000 to be elevated off the ground. Once so elevated, casters 105 (i.e., wheels, free to pivot 360 degrees) on the dollies 100 allow the helicopter 1000 to be wheeled across the ground into whatever position is desired.

Figure 2:
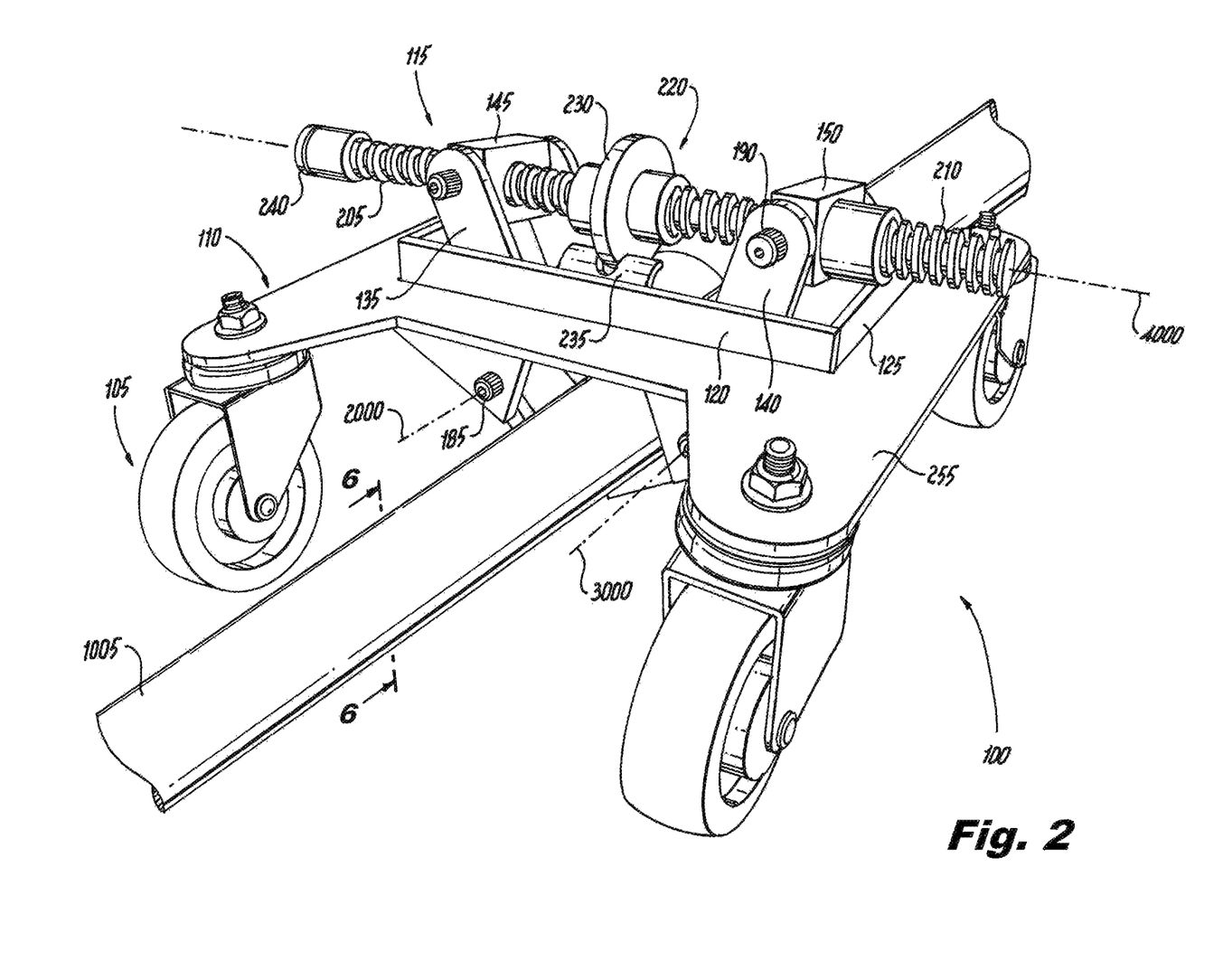
FIG. 2 shows a perspective view of a representative one of the FIG. 1 apparatus with a helicopter skid.
Figure 3:
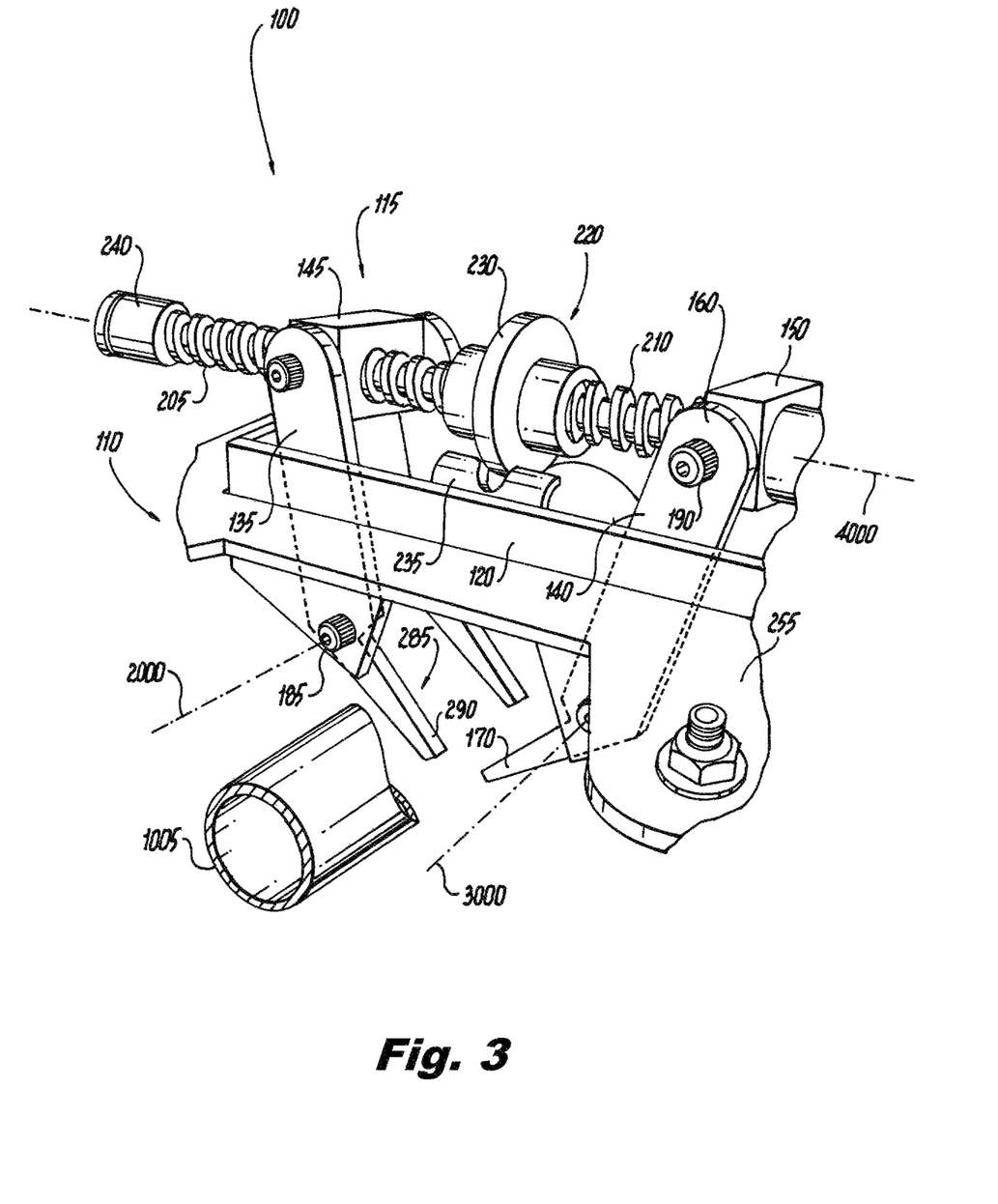
FIG. 3 shows a perspective view of a portion of the FIG. 2 apparatus with hidden aspects made visible.
Figure 4:
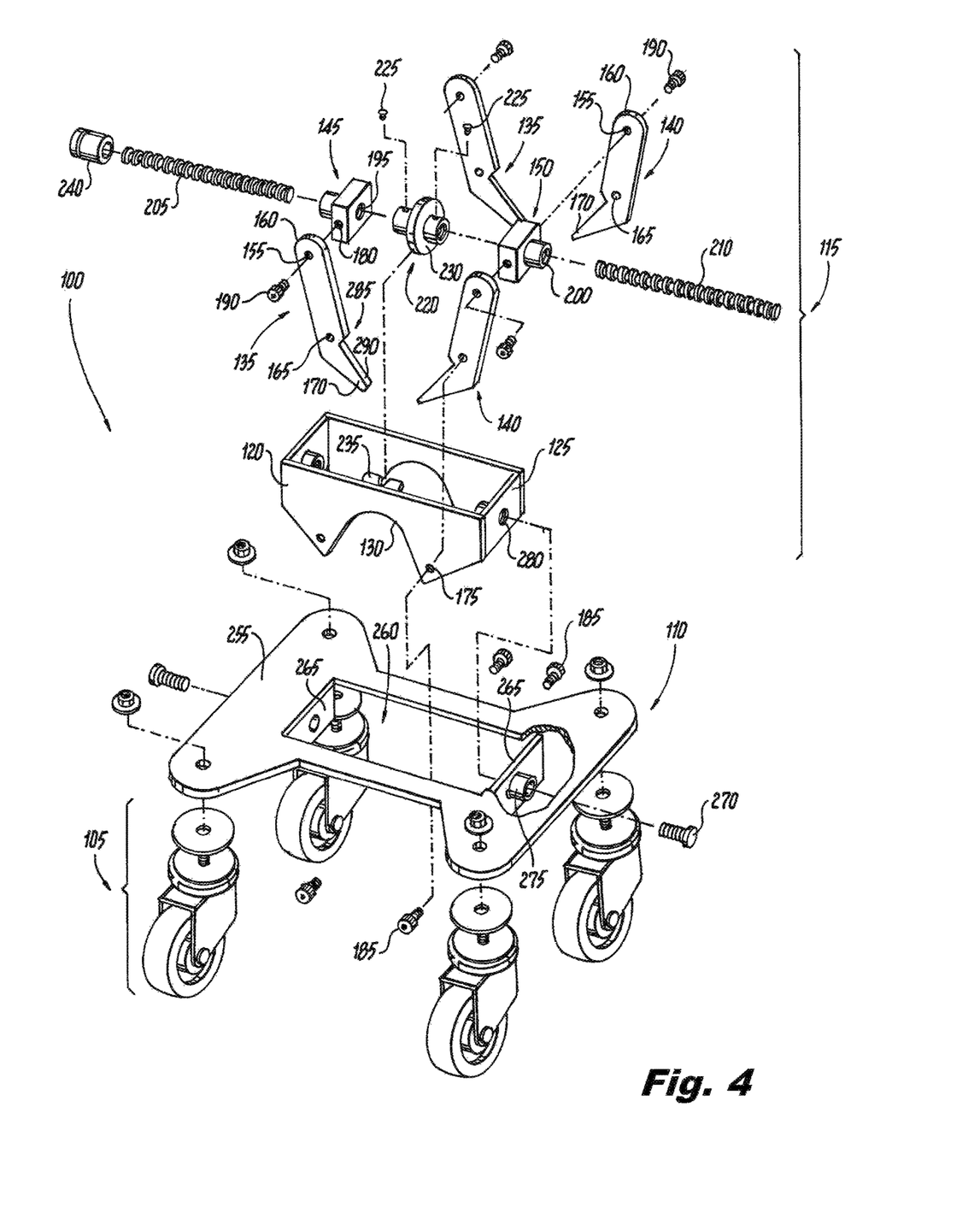
FIG. 4 shows an exploded perspective view of the FIG. 2 apparatus.

Additional details of a representative one of the dollies 100 are provided in FIGS. 2-4, with FIG. 2 showing a perspective view of the dolly 100 with one of the skids 1005; FIG. 3 showing a perspective view of a portion of the dolly 100 with hidden features made visible; and FIG. 4 showing an exploded perspective view of the dolly 100. The dolly 100 comprises a platform 110 that supports a carriage 115. The four casters 105 are pivotally attached to the platform 110.

The carriage 115 comprises four sidewalls: two longer sidewalls 120 and two shorter sidewalls 125. The two longer sidewalls 120 are oriented perpendicular to the shorter sidewalls 125 to form a four-sided box. Each of the longer sidewalls 120 defines a u-shaped cutout 130 that helps to accommodate a skid during use. A pair of left arms 135 occupy one side of the box, while a pair of right arms 140 occupy the other side of the box. The pair of left arms 135 are separated by a left block assembly 145 so that the pair of left arms 135 are disposed in spaced relation to each other, while the pair of right arms 140 are separated by a right block assembly 150 so that the pair of right arms 140 are disposed in spaced relation to each other.

Function of the dolly 100 is enabled by having each of the arms 135, 140 be simultaneously rotationally coupled to one of the longer sidewalls 120 and to one of the block assemblies 145, 150. This coupling is facilitated by utilizing a unique combination of threaded holes, smooth-bored holes, and bolts. Each arm 135, 140 defines an upper smooth-bored hole 155 near its proximal end 160, as well as a lower threaded hole 165 about two-thirds of the way from the proximal end 160 to the arm's distal end 170. The longer sidewalls 120, in turn, comprise a smooth-bored hole 175 corresponding to each arm 135, 140, while each of the block assemblies 145, 150 defines two oppositely oriented threaded holes 180. Attachment of a given arm 135, 140 to the remainder of the carriage 115 is accomplished by passing a lower bolt 185 through the smooth-bored hole 175 in one of the longer sidewalls 120, and then threadably engaging the lower bolt 185 in the lower threaded hole 165 in the arm 135, 140. An upper bolt 190 is passed through the upper smooth-bored hole 155 in the arm 135, 140 and threadably engages the threaded hole 180 in the corresponding block assembly 145, 150. When this type of fixation is accomplished for each of the four arms 135, 140, the pair of left arms 135 is pivotally coupled to the left block assembly 145, and the pair of right arms 140 is pivotally coupled to the right block assembly 150. At the same time, the pair of left arms 135 is operative to pivot relative to the longer sidewalls 120 about a left lateral axis 2000, and the pair of right arms 140 is operative to pivot relative to the longer sidewalls 120 about a right lateral axis 3000. The right lateral axis 3000 is substantially parallel to the left lateral axis 2000.

The left block assembly 145 defines a left internally threaded passage 195 that passes through it, while the right block assembly 150 defines a right internally threaded passage 200 that passes through it. Both internally threaded passages 195, 200 have central axes that are oriented perpendicular to the shorter sidewalls 125. A left screw portion 205 passes through and threadably engages the left internally threaded passage 195, while a right screw portion 210 passes through and threadably engages the right internally threaded passage 200. The left and right screw portions 205, 210 each terminate in a central screw hub 220, which is disposed between the left and right block assemblies 145, 150. Set screws 225 pass through the central screw hub 220 and rotatably couple the left and right screw portions 205, 210 to the central screw hub 220 and ultimately to each other. Rotation of the left screw portion 205 thereby turns the right screw portion 210, and vice versa. A knob 240 attached to an end of the left screw portion 210 provides a convenient means for a user to manually induce this kind of rotational motion. A circular flange 230 on the central screw hub 220 engages a notched guide 235 affixed to the top of one of the longer sidewalls 120, which restricts the central screw hub 220 from translating relative to the remainder of the carriage 115.

The left screw portion 205 has threads that are oppositely oriented from the right screw portion 210. Rotating the left and right screw portions 205, 210 in one direction thereby causes the left and right block assemblies 145, 150 to move away from each other, while rotating the screw portions 205, 210 in the opposite direction causes the left and right block assemblies 145, 150 to move towards each other. As the distance between the left and right block assemblies 145, 150 is modified, a distance between the proximal ends 160 of the left arms 135 and the proximal ends 160 of the right arms 140 (labeled as d in FIG. 5) is likewise made to increase and decrease. The left and right screw portions 205, 210 thereby form an actuation mechanism operatively coupled to the proximal ends 160 of the left arms 135 and the proximal ends 160 of the right arms 140, and adapted to allow the distance, d, between these proximal ends 160 to be modified. Owing to the pivotal nature of the left and right arms 135, 140 about the lateral axes 2000, 3000, increasing d via the screw portions 205, 210 causes the distal ends 170 of the left arms 135 and the right arms 135 to swing towards each other. Decreasing d causes the distal ends 170 of the left arms 135 and the right arms 135 to swing away from each other. The pair of left arms 135 swing in unison with each other, while the pair of right arms 140 swing in unison with each other.

The platform 110 defines a plate 255 with a rectangular opening 260 therein, and two substantially parallel platform endwalls 265. The carriage 115 occupies the rectangular opening 260 and is positioned between the platform endwalls 265. Two platform bolts 270 pass through smooth-bored cylindrical openings 275 (i.e., bushings) in the two platform endwalls 265 and threadably engage corresponding threaded cylindrical openings 280 in the carriage 115. The entire carriage 115 is therefore operative to pivot relative to the platform 110 along a longitudinal axis 4000. The longitudinal axis 4000 is substantially perpendicular to the lateral axes 2000, 3000. With the castersp 105 positioned below the platform 110 in the manner shown in the figures, the distal ends 170 of the arms 135, 140 are positioned below the platform 110 and lateral to the casters 105.

Figure 5:
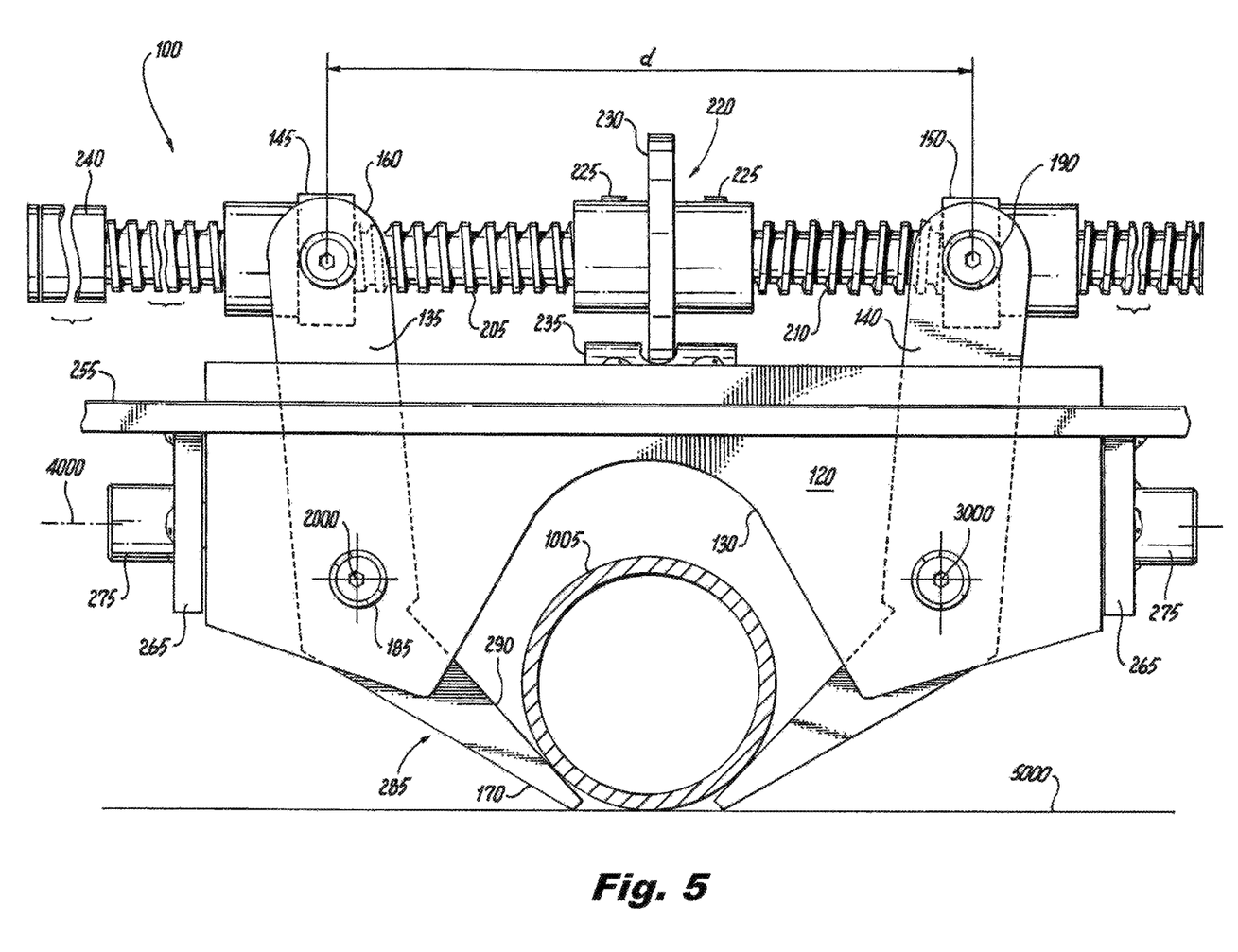
FIGS. 5 and 6 show side elevational views of portions of the FIG. 2 apparatus while engaging a helicopter skid.
Figure 6:
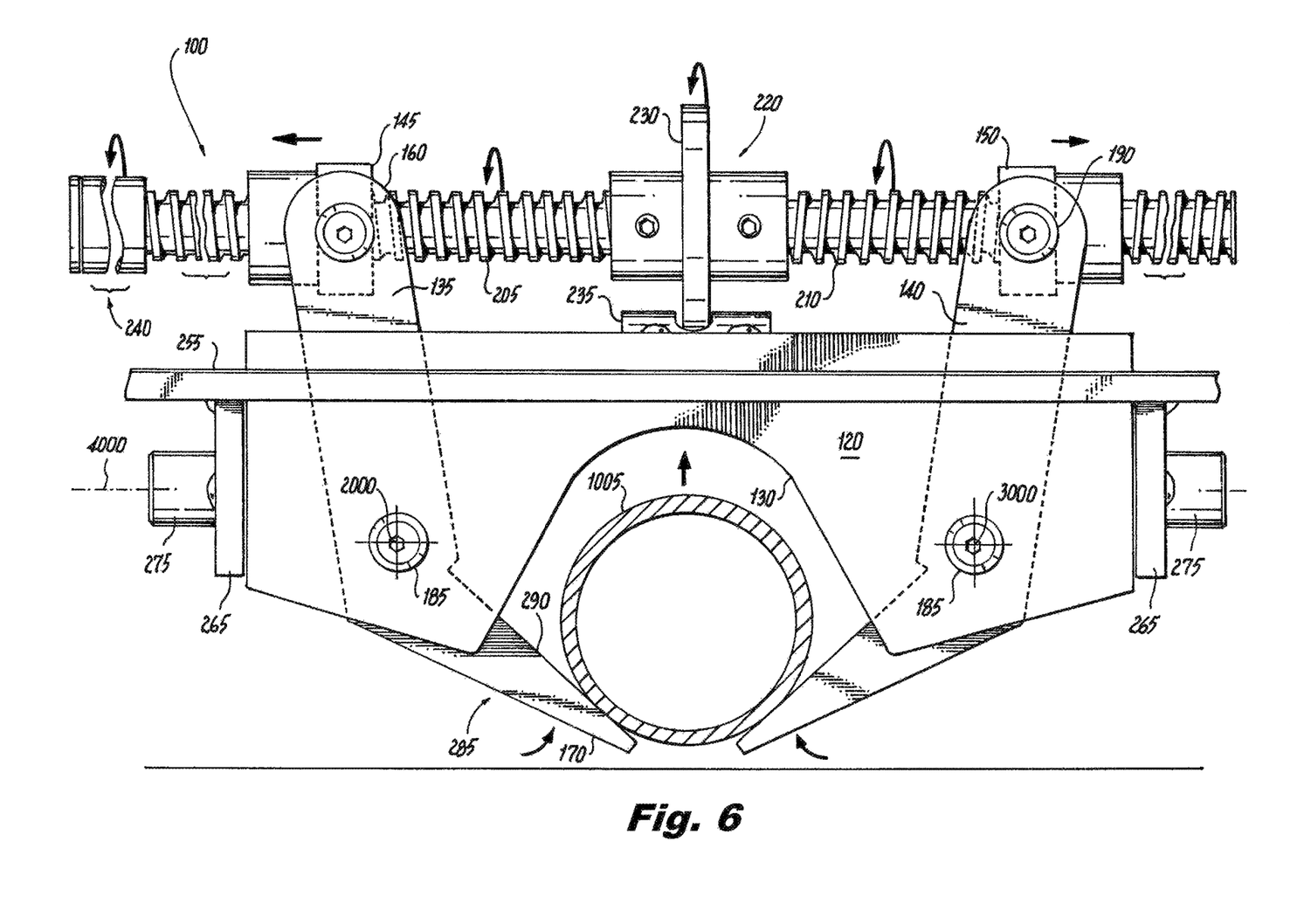

Each of the arms 135, 140 defines an angled finger 285 at its proximal end 160 with a flat surface 290 that contacts the skid 1005 during use. Additional details of the interaction between the dolly 100 and the skid 1005 during use are shown in FIGS. 5 and 6, which show side elevational views of portions of the dolly 100 while engaging the skid 1005. FIG. 5 shows the initial engagement of the arms 135, 140 with the skid 1005 while the skid 1005 is still on a ground surface 5000 (i.e., a horizontal surface). The skid 1005 occupies the u-shaped cutouts 130, and the arms 135, 140 may also contact the ground surface 5000 so that the fingers 285 may readily reach under the skid 1005. FIG. 6, in turn shows the manner in which the arms 135, 140 lift the skid 1005 off the ground surface 5000 as the screw portions 205, 210 are manually rotated. During the lifting, the skid 1005 slides up higher on the arms 135, 140 as the distal ends 170 of the arms 135, 140 swing towards each other and the fingers 285 reach further under the skid 1005. The aforementioned flat surfaces 290 of the fingers 285 reduce any resistance associated with this sliding motion. Dropping the skid 1005 is as easy as rotating the screw portions 205, 210 in the opposite direction.

Figure 7:
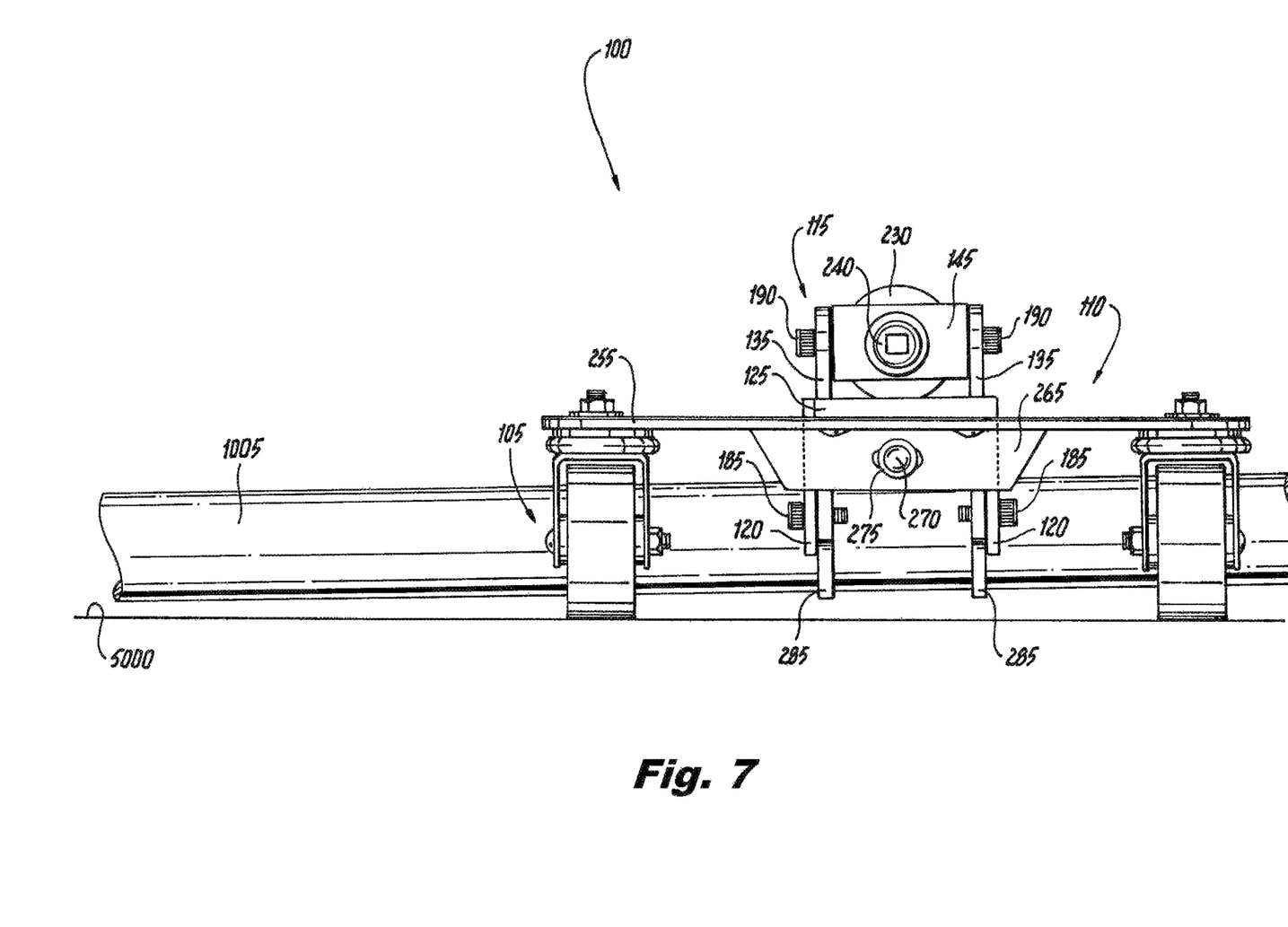
FIGS. 7-9 show end elevational views of the FIG. 2 apparatus while engaging a helicopter skid.
Figure 8:
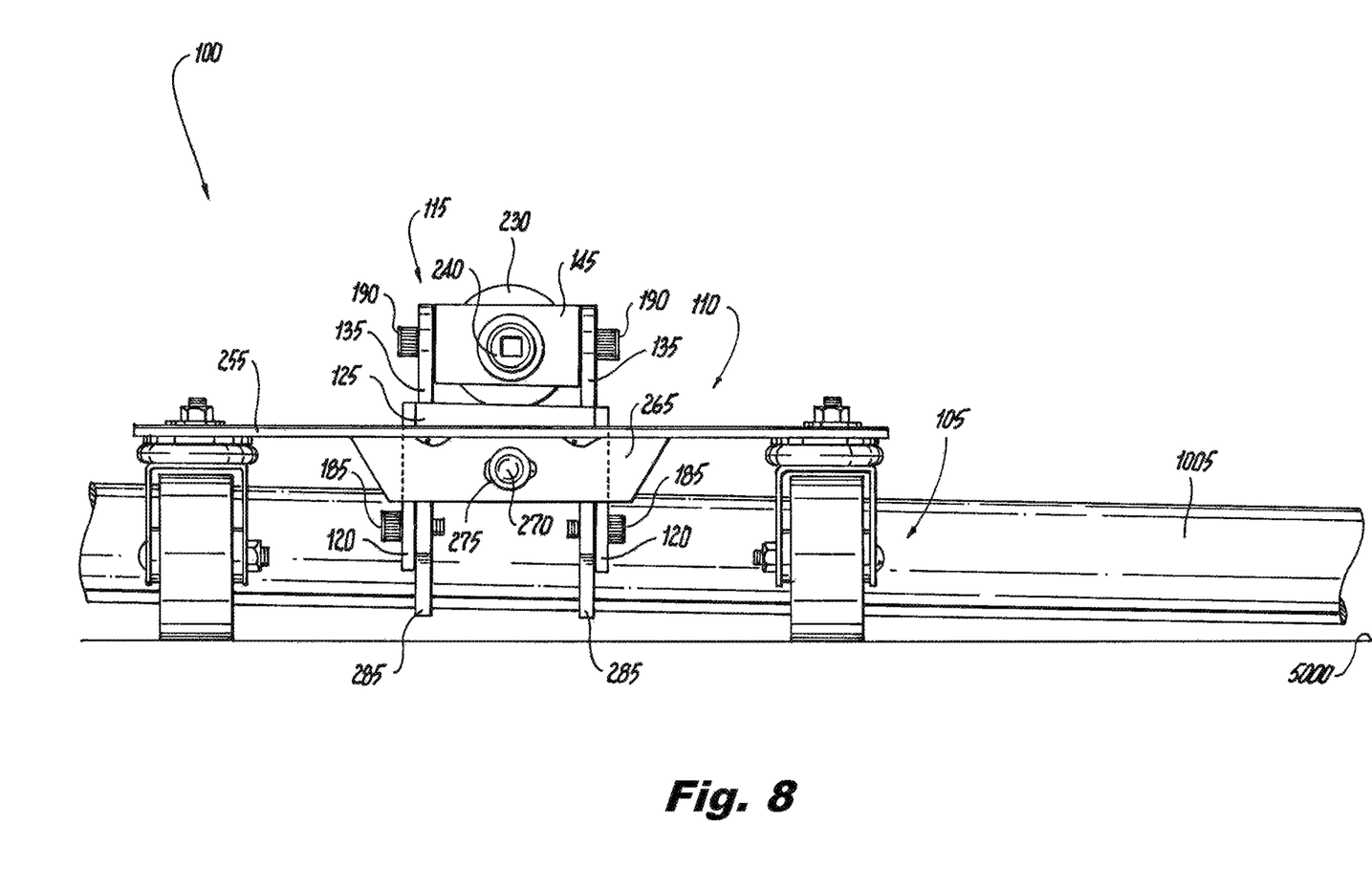
Figure 9:
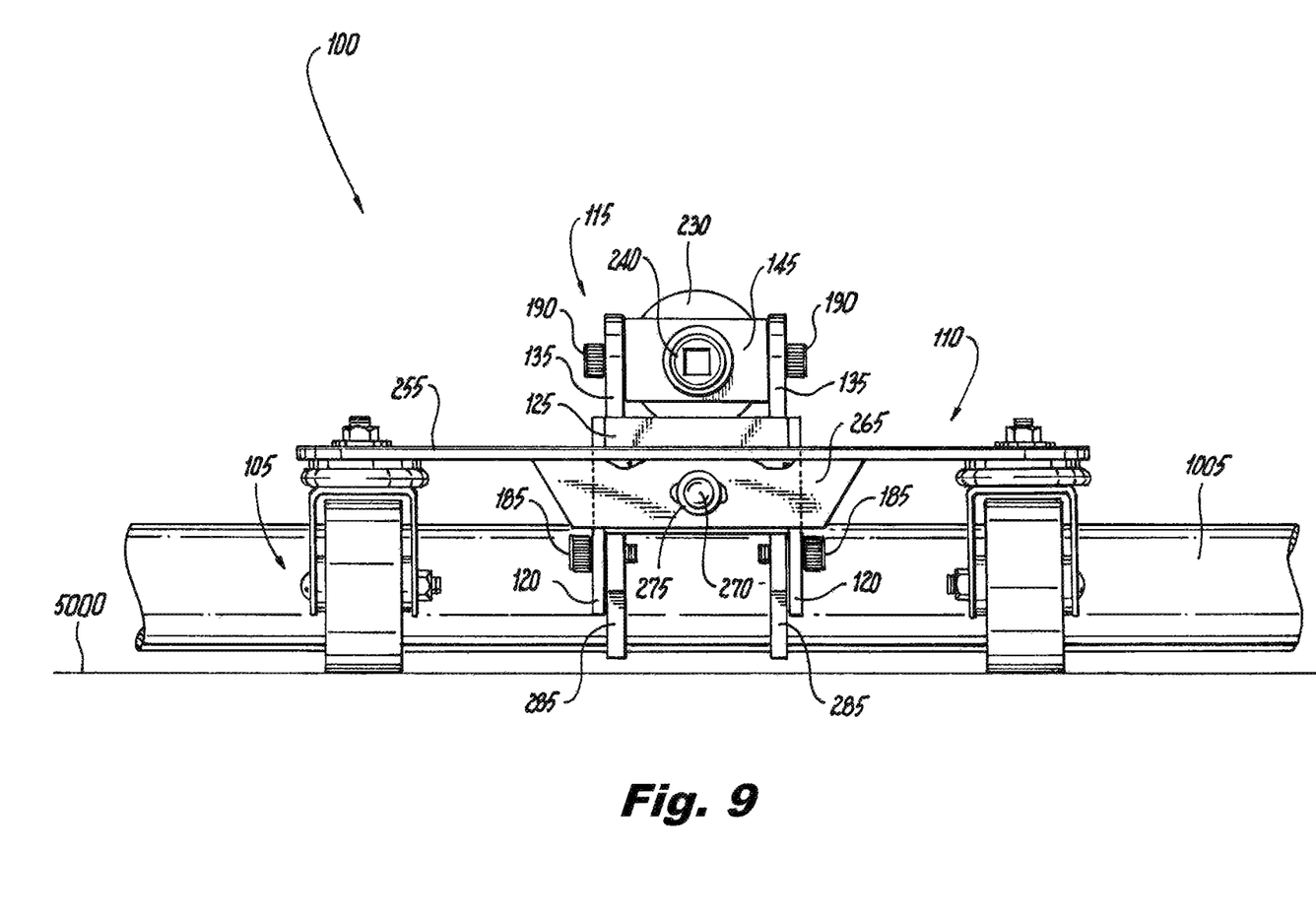

As indicated above, the carriage 115 is operative to pivot relative to the platform 110 about the longitudinal axis 4000. This extra degree of rotational freedom aids the dolly 100 in effectively lifting the skid 1005. FIGS. 7-9 show end elevational views of the dolly 1005 while lifting the skid 1005. When the dolly 100 is the first dolly to lift the skid 1005, a portion of the skid 1005 proximate to the dolly 100 comes off the ground surface 5000 as the dolly 100 is engaged, while another portion of the skid distant from the dolly 100 remains in contact with the ground surface 5000. This will effectively tilt the skid 1005. At the same time, when the dolly 100 is the second dolly to be placed on the skid 1005, the skid 1005 will already be tilted due to the placement of the earlier dolly 100. FIGS. 8 and 9 show conditions wherein the skid 1005 is tilted downward to the left and is tilted downward to the right, respectively. In both cases, the carriage 115 pivots about the longitudinal axis 4000 to match the tilt in the skid 1005. Such accommodation assures that the weight of the helicopter 1000 remains uniformly distributed on the arms 135, 140 of the dolly 100. Without such an ability to rotate to accommodate the tilt in the skid 1005, the weight of the helicopter 1000 may be non-uniformly distributed over the arms 135, 140, placing undue stress on the dolly 100. FIG. 9 shows the condition once the lift is completed by two dollies 100, and the skid 1005 is level.

The dollies 100 set forth above, and, more generally, apparatus in accordance with aspects of the invention, provide a simple, compact, and cost-effective means by which to position helicopters equipped with skids while on the ground. Once a helicopter has landed, four such dollies 100 may be placed on the helicopter and used to effectively lift the helicopter's skids off the ground and place the weight of the helicopter on the dollies 100 (see FIG. 1). Casters 105 on the dollies 100 then allow the helicopter to be translated, turned, pivoted, etc. The dollies 100 are small and may therefore be carried in the helicopter to remote landing sites. When using a screw or screws in the manner indicated above, actuation of the dollies 100 may be solely by human power. No dependence is placed on electrical systems (e.g., motors), hydraulic systems, pneumatic systems, or gasoline engines. Maintenance is almost non-existent.

Once the dolly 100 is understood from the description provided herein, its manufacture will be well within that of a person having ordinary skill in the manufacturing arts. Parts may be formed of metal such as steel. Metal parts may be powder coated to enhance durability. Many of the parts (e.g., the casters 105 and screw portions 205, 210) may be sourced commercially.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

As just a few examples, one or more of the bolts 185, 190, 270 in the above-described dolly 100 may be partially threaded (i.e., define a shaft that is smooth proximal to its head and externally threaded distal to its head) to aid with rotation about the axes 2000, 3000, 4000, or may even be replaced by pins. In addition, the screw portions 205, 210 may be combined into a single unified screw rather than being provided in two parts, possibly obviating the need for the central screw hub 220. Similarly, the pair of left arms 135 may be provided as a single unified member rather than being two separate elements, with a like arrangement for the pair of right arms 140. The dolly 100 may even be provided without a rotational degree of freedom about the axis 4000, although including that degree of freedom is considered advantageous for the reasons set forth above, and is therefore preferred.

Figure 10:
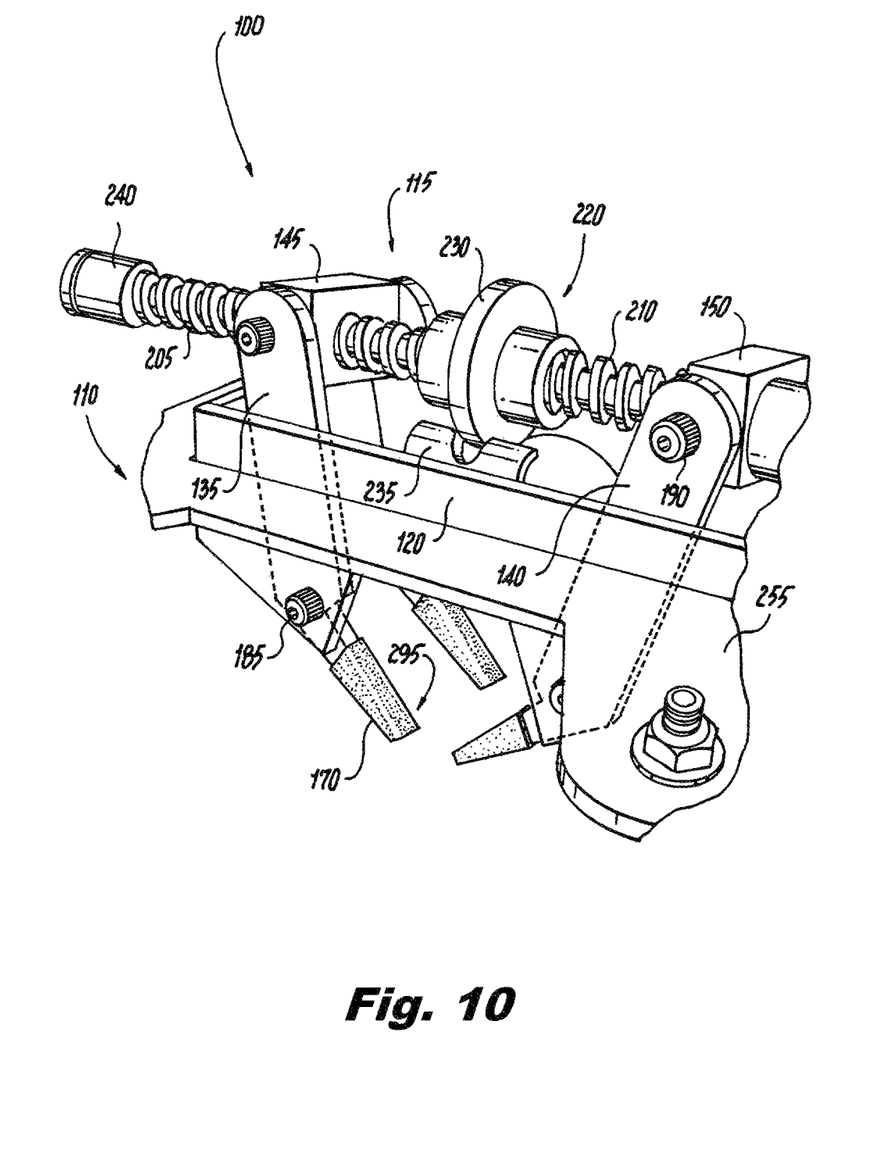
FIG. 10 shows a perspective view of a portion of the FIG. 2 apparatus with additional optional features.

Additional features may also be added to the dolly 100, or, more generally, apparatus in accordance with embodiments of the invention. FIG. 10, for example, shows a perspective view of a portion of the dolly 100 with the addition of protectors 295 on the distal ends 170 of the arms 135, 140. The protectors 295 may help to reduce any scratching damage to the skids of a helicopter during use of the dolly 100. The protectors 295 may be formed of, for example, rubber or plastic material.

In addition, rather than having a manually operated screw mechanism like that described above, a similar screw mechanism may be driven by an electric motor, an internal combustion engine, and the like. Alternative embodiments falling within the scope of the invention may not even use screws, and, may instead utilize entirely different actuation mechanisms. These alternative actuation mechanisms may include any mechanism capable of increasing/decreasing the distance between proximal ends of the arms (e.g., the distance d in the dolly 100), and may include, as just a few non-limiting examples, pneumatic cylinders, hydraulic cylinders, linear ratchet mechanisms, and electric linear actuators.

Figure 11:
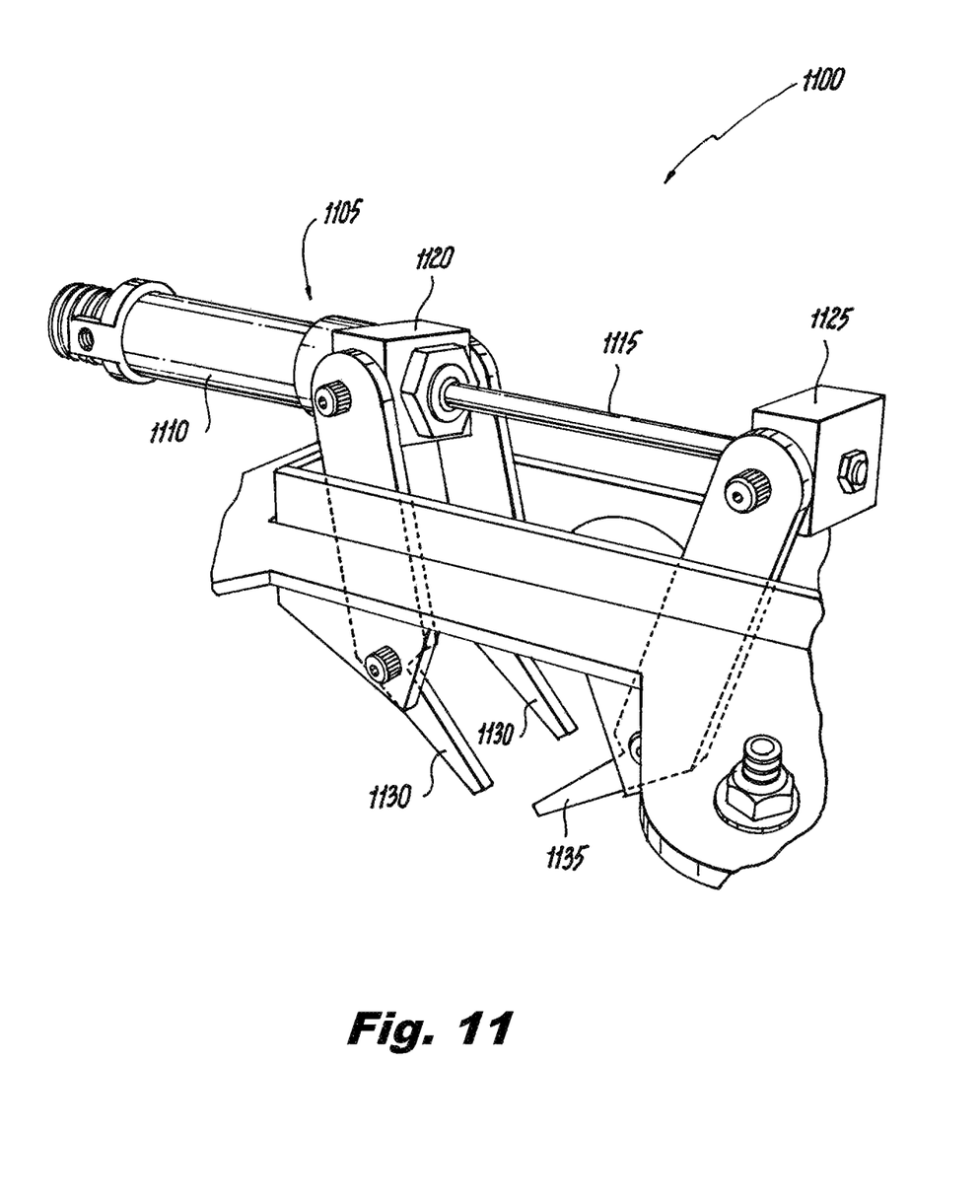
FIG. 11 shows a perspective view of a portion of an apparatus in accordance with an alternative embodiment of the invention.

Suitable pneumatic, hydraulic, and electric actuation mechanisms may be obtained from, for example, Parker Hannifin Corp. (Cleveland, Ohio, USA). FIG. 11 shows a perspective view of a portion of an exemplary alternative dolly 1100 that includes a pneumatic cylinder 1105 that actuates the dolly 1100. The pneumatic cylinder 1105 includes a cylindrical housing 1110 with a piston rod 1115 whose degree of extension from the cylindrical housing 1110 is adjustable through the provisioning of pressurized air. With the cylindrical housing 1110 attached to a left block 1120, and the piston rod 1115 attached to the right block 1125, the distance between those blocks 1120, 1125 becomes adjustable. Actuating the pneumatic cylinder 1105, in turn, swings left arms 1130 and right arms 1135 to provide the functionality set forth above when describing the dolly 100. A hydraulic cylinder may appear similar to the pneumatic cylinder 1105, and would be actuated in response to the provisioning of pressurized hydraulic fluid.

Figure 12:
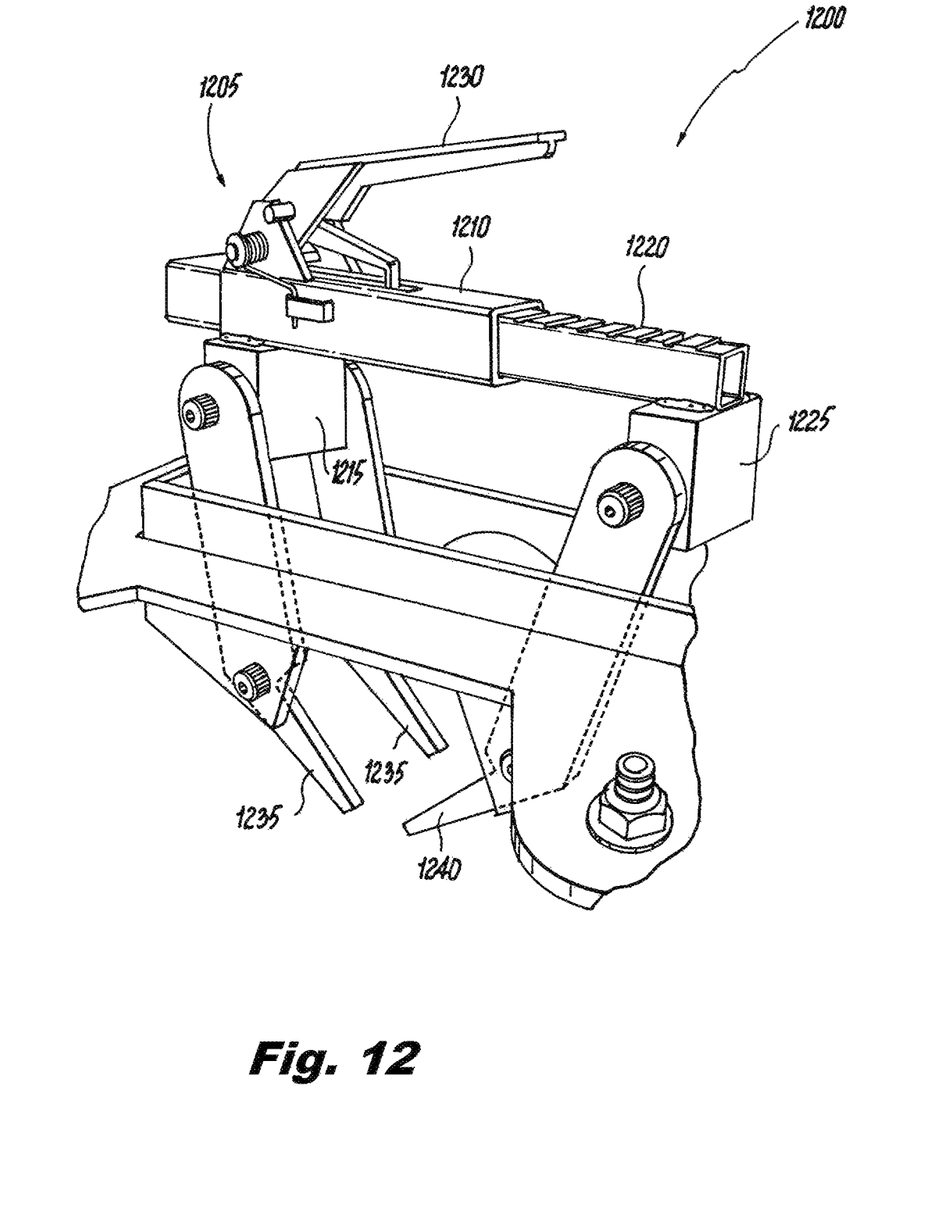
FIG. 12 shows a perspective view of a portion of an apparatus in accordance with another alternative embodiment of the invention.

Suitable linear ratchet mechanisms may be sourced from, for example, Zendex Tool Corporation (Danbury, Conn., USA). FIG. 12 shows a perspective view of a portion of an exemplary alternative dolly 1200 that includes a linear ratchet mechanism 1205. The linear ratchet mechanism 1205 includes an outer square tube 1210 mated to a left block 1215 of the dolly 1200, and an inner square tube 1220 mounted to a right block 1225. Actuation of a handle 1230 on the linear ratchet mechanism 1205 causes the distance between the left and right blocks 1215, 1225 to change, and, causes left arms 1235 and right arms 1240 to swing to achieve the desired functionality.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. An apparatus comprising:
   a platform;
   a plurality of casters pivotally attached to the platform;
   a carriage supported by the platform and comprising:
   a left arm operative to pivot about a left lateral axis;

a right arm operative to pivot about a right lateral axis that is substantially parallel to the left lateral axis; and an actuation mechanism operatively coupled to a proximal end of the left arm and a proximal end of the right arm and adapted to allow a distance between the proximal end of the left arm and the proximal end of the right arm to be modified;

wherein:
increasing the distance causes a distal end of the left arm and a distal end of the right arm to swing towards each other; and decreasing the distance causes the distal end of the left arm and the distal end of the right arm to swing away from each other.

2. The apparatus of claim 1, wherein:
the platform comprises a plate with an opening therein; and
the carriage occupies the opening.

3. The apparatus of claim 1, wherein the carriage is operative to pivot relative to the platform about a longitudinal axis that is substantially perpendicular to the left lateral axis and the right lateral axis.

4. The apparatus of claim 1, wherein:
the platform defines two substantially parallel endwalls; and
the carriage is positioned between the two substantially parallel endwalls.

5. The apparatus of claim 1, wherein, with the plurality of casters positioned below the platform, the distal end of the left arm and the distal end of the right arm are positioned below the platform and lateral to the plurality of casters.

6. The apparatus of claim 1, wherein, with the casters resting on a horizontal surface, the actuation mechanism may be configured to cause the distal end of the left arm and the distal end of the right arm to contact the horizontal surface.

7. The apparatus of claim 1, wherein:
the carriage comprises a pair of substantially parallel sidewalls; and
the left arm and the right arm is each pivotally attached to at least one of the pair of substantially parallel sidewalls.

8. The apparatus of claim 7, wherein the carriage further comprises a second pair of sidewalls that span between the pair of substantially parallel sidewalls.

9. The apparatus of claim 1, wherein the actuation mechanism comprises one or more screws.

10. The apparatus of claim 1, further comprising:
a left block assembly; and
a right block assembly;
wherein:
the left arm is pivotally attached to the left block assembly; and
the right arm is pivotally attached to the right block assembly.

11. The apparatus of claim 10, wherein the actuation mechanism is coupled to the left block assembly and the right block assembly.

12. The apparatus of claim 10, wherein the actuation mechanism comprises:
a first screw portion passing through the left block assembly; and
a second screw portion with oppositely oriented threads from the first screw portion passing through the right block assembly.

13. The apparatus of claim 1, wherein the actuation mechanism comprises a linear ratchet mechanism.

14. The apparatus of claim 1, wherein the actuation mechanism comprises a pneumatic cylinder or a hydraulic cylinder.

15. The apparatus of claim 1, wherein the carriage further comprises:
an additional left arm positioned in spaced relation to the left arm and moving in unison therewith; and
an additional right arm positioned in spaced relation to the right arm and moving in unison therewith.

16. The apparatus of claim 1, wherein the left arm is partially covered with a rubber or a plastic material.

17. A method for moving a helicopter with a skid initially resting on a ground surface, the method comprising the steps of:
acquiring an apparatus comprising:
a platform;
a plurality of casters pivotally attached to the platform;
a carriage supported by the platform and comprising:
a left arm operative to pivot about a left lateral axis;
a right arm operative to pivot about a right lateral axis that is substantially parallel to the left lateral axis; and
an actuation mechanism operatively coupled to a proximal end of the left arm and a proximal end of the right arm and adapted to allow a distance between the proximal end of the left arm and the proximal end of the right arm to be modified;
wherein:
increasing the distance causes a distal end of the left arm and a distal end of the right arm to swing towards each other; and
decreasing the distance causes the distal end of the left arm and the distal end of the right arm to swing away from each other; and
causing the left arm and the right arm to swing against the skid and lift at least part of the skid off the ground surface so that the plurality of casters are supporting some portion of a weight of the helicopter.

18. An apparatus comprising:
a helicopter comprising a skid;
a platform;
a plurality of casters pivotally attached to the platform;
a carriage supported by the platform and comprising:
a platform;
a plurality of casters pivotally attached to the platform;
an assembly supported by the platform and comprising:
a left arm operative to pivot about a left lateral axis;
a right arm operative to pivot about a right lateral axis that is substantially parallel to the left lateral axis; and
an actuation mechanism operatively coupled to a proximal end of the left arm and a proximal end of the right arm and adapted to allow a distance between the proximal end of the left arm and the proximal end of the right arm to be modified;
wherein:
increasing the distance causes a distal end of the left arm and a distal end of the right arm to swing towards each other;
decreasing the distance causes the distal end of the left arm and the distal end of the right arm to swing away from each other;

the left arm and the right arm are pressed against the skid; and the plurality of casters support some portion of a weight of the helicopter.

* * * * *